(12) United States Patent
Guethle et al.

(10) Patent No.: US 12,215,486 B2
(45) Date of Patent: Feb. 4, 2025

(54) BRACKET ASSEMBLY FOR MOUNTING VISUAL PERCEPTION DEVICES TO MOBILE CONSTRUCTION MACHINE

(71) Applicant: Caterpillar Inc., Peoria, IL (US)

(72) Inventors: Marcus John Guethle, Oswego, IL (US); Francisco J Acevedo, Sr., Elgin, IL (US); Jahaziel Pérez Ureta, Apodaca (MX)

(73) Assignee: Caterpillar Inc., Peoria, IL (US)

( * ) Notice: Subject to any disclaimer, the term of this patent is extended or adjusted under 35 U.S.C. 154(b) by 74 days.

(21) Appl. No.: 17/814,242

(22) Filed: Jul. 22, 2022

(65) Prior Publication Data

US 2024/0026652 A1  Jan. 25, 2024

(51) Int. Cl.
  *E02F 9/26* (2006.01)
  *B60R 1/00* (2022.01)

(52) U.S. Cl.
  CPC ............... *E02F 9/261* (2013.01); *B60R 1/00* (2013.01); *B60R 2300/105* (2013.01)

(58) Field of Classification Search
  CPC ....... E02F 9/261; B60R 1/00; B60R 2300/105
  See application file for complete search history.

(56) References Cited

U.S. PATENT DOCUMENTS

| | | |
|---|---|---|
| 7,440,027 B2 | 10/2008 | Weaver |
| 2004/0119881 A1* | 6/2004 | Matko ................ B60R 11/04 |
| | | 348/375 |
| 2013/0259624 A1* | 10/2013 | Manabe ............... B60R 11/04 |
| | | 414/687 |
| 2015/0077614 A1 | 3/2015 | King |
| 2018/0223503 A1* | 8/2018 | Imano ..................... H04N 5/28 |
| 2020/0318786 A1* | 10/2020 | Nighswander ......... F16M 11/10 |

FOREIGN PATENT DOCUMENTS

| | | | |
|---|---|---|---|
| JP | 2016212344 A | * | 12/2016 |
| JP | 2020162145 A | | 10/2020 |
| KR | 1020130071522 A | | 7/2013 |
| KR | 20140052436 A | * | 5/2014 |

(Continued)

OTHER PUBLICATIONS

Written Opinion and International Search Report for Int'l. Patent Appln. No. PCT/US2023/068666, mailed Oct. 17, 2023 (10 pgs).

*Primary Examiner* — Sath V Perungavoor
*Assistant Examiner* — Tyler B Edwards

(57) ABSTRACT

A bracket assembly, for mounting a visual perception device to a structure of a mobile construction machine, includes a first bracket and a second bracket. The first bracket is selectively positionable in a plurality of first positions with respect to the structure. The plurality of first positions is defined around a first axis. The second bracket defines a first portion and a second portion. The first portion is selectively positionable in a plurality of second positions with respect to the first bracket. The plurality of second positions is defined around a second axis. The second portion extends from the first portion. The second portion facilitates a selective positioning of the visual perception device in a plurality of third positions with respect to the second portion. The plurality of third positions is defined around a third axis.

20 Claims, 4 Drawing Sheets

(56) References Cited

FOREIGN PATENT DOCUMENTS

| KR | 1020140052436 A | | 5/2014 |
|---|---|---|---|
| KR | 101445176 B1 | * | 9/2014 |
| KR | 101783111 B1 | | 9/2017 |
| WO | 2016076233 A1 | | 5/2016 |
| WO | 2018079878 A1 | | 5/2018 |

* cited by examiner

BRACKET ASSEMBLY FOR MOUNTING VISUAL PERCEPTION DEVICES TO MOBILE CONSTRUCTION MACHINE

TECHNICAL FIELD

The present disclosure relates to visual perception devices in mobile construction machines. More particularly, the present disclosure relates to a bracket assembly for mounting a visual perception device to a mobile construction machine.

BACKGROUND

Mobile construction machines, such as wheel loaders, excavators, compactors, pavers, haul trucks, dozers, motor graders, and other types of equipment are known for performing a variety of construction or earth moving tasks. Such a mobile construction machine may be equipped with one or more visual perception devices, for example, a camera, to facilitate monitoring of the machine's surroundings during operations. Generally, the visual perception devices are mounted to the mobile construction machine to capture and collectively provide video feeds of the machine's surroundings, via a display screen, to an operator of the machine. A manner in which some of the visual perception devices may be mounted may cause the corresponding video feeds to be inappropriately aligned for comfortable operator viewing.

U.S. Patent Application No. 2015/0077614 discloses a video imaging system for use in different applications, such as medical/surgical imaging, engineering and remote diagnostics, video conferencing, etc. The video imaging system includes a camera mounted on a remotely controlled rotate-pan-tilt mount for three-axis rotation about three mutually orthogonal axes, a vertical yaw axis, a horizontal roll axis, and a horizontal pitch axis, all three axes intersecting at a common point.

SUMMARY OF THE INVENTION

In an aspect, the present disclosure relates to a bracket assembly for mounting a visual perception device to a structure of a mobile construction machine. The bracket assembly includes a first bracket and a second bracket. The first bracket is selectively positionable in a plurality of first positions with respect to the structure. The plurality of first positions is defined around a first axis. The second bracket defines a first portion and a second portion. The first portion is selectively positionable in a plurality of second positions with respect to the first bracket. The plurality of second positions is defined around a second axis. The second portion extends from the first portion. The second portion facilitates a selective positioning of the visual perception device in a plurality of third positions with respect to the second portion. The plurality of third positions is defined around a third axis.

In another aspect, the present disclosure is directed to a mobile construction machine. The mobile construction machine includes a structure, a visual perception device, and a bracket assembly. The structure extends outwardly towards a lateral side of the mobile construction machine. The visual perception device is configured to obtain a visual feed of an external environment of the mobile construction machine from the lateral side of the mobile construction machine. The bracket assembly is configured to mount the visual perception device to the structure. The bracket assembly includes a first bracket and a second bracket. The first bracket is selectively positionable in a plurality of first positions with respect to the structure. The plurality of first positions is defined around a first axis. The second bracket defines a first portion and a second portion. The first portion is selectively positionable in a plurality of second positions with respect to the first bracket. The plurality of second positions is defined around a second axis. The second portion extends from the first portion. The second portion facilitates a selective positioning of the visual perception device in a plurality of third positions with respect to the second portion. The plurality of third positions is defined around a third axis.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
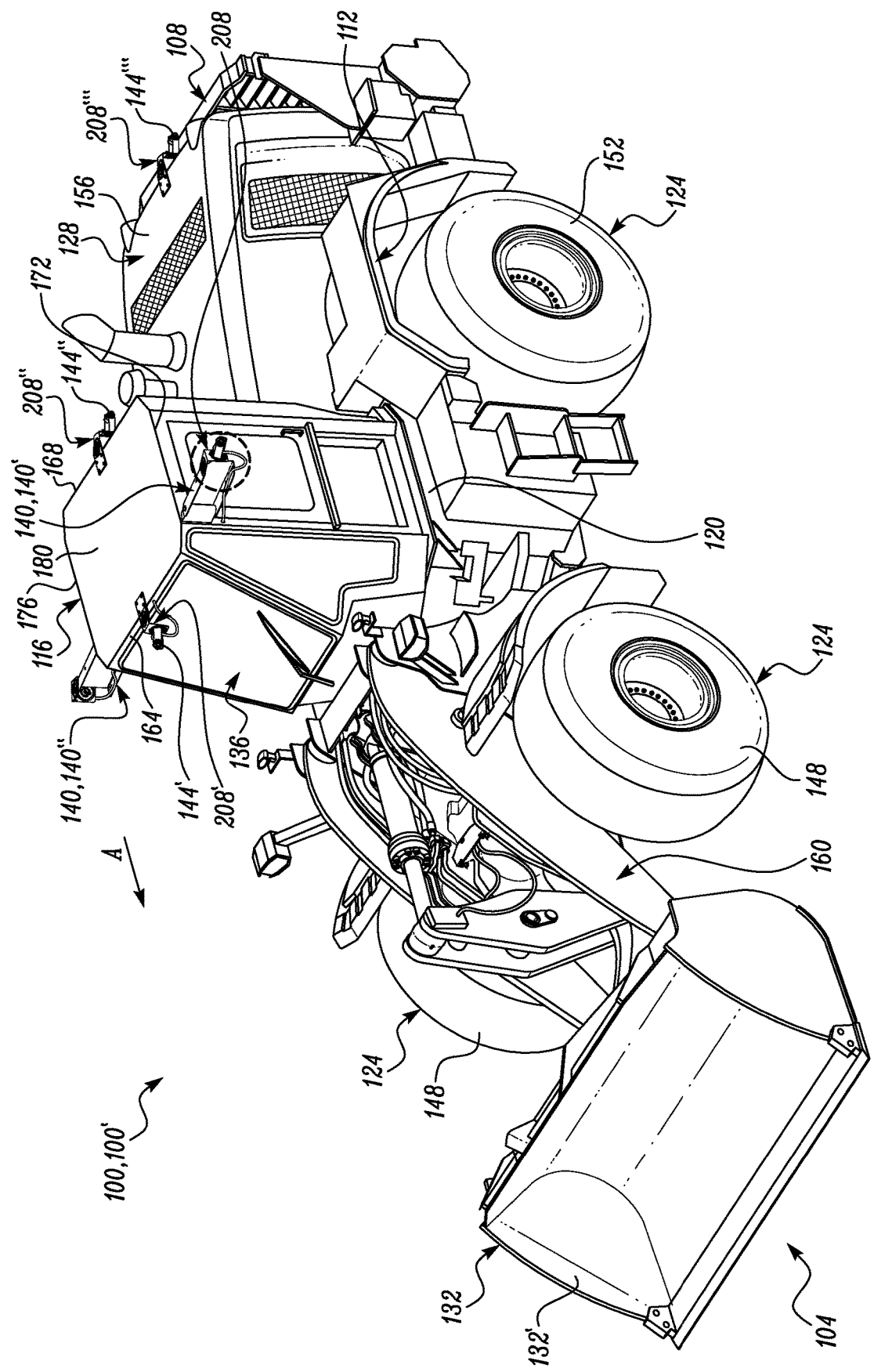
FIG. 1 illustrates an exemplary mobile construction machine having visual perception devices mounted thereon, in accordance with an embodiment of the present disclosure.

Referring to FIG. 1 an exemplary mobile construction machine 100 (hereinafter referred to as "machine 100") is shown. The machine 100 may operate at a worksite that may include a mine site, a landfill, a quarry, a construction site, or any other type of worksite. The machine 100 is embodied as a wheel loader 100' herein. Alternatively, the machine 100 may be embodied as dump trucks, loaders, excavators, cold planar, off-highway trucks, and/or the like. Further, the machine 100 may be a manned machine or an unmanned machine.

The machine 100 may include a forward end 104 and a rearward end 108 opposite to the forward end 104. The forward end 104 and the rearward end 108 may be defined in relation to an exemplary direction of travel of the machine 100 (indicated by an arrow 'A'), with said direction of travel being defined from the rearward end 108 towards the forward end 104. Also, the machine 100 may include two lateral sides, i.e., a first lateral side 112 (or left side) and a second lateral side 116 (or right side) opposite to the first lateral side 112. The first lateral side 112 and the second lateral side 116 may be located transversely relative to the exemplary direction of travel 'A' of the machine 100.

Figure 2:
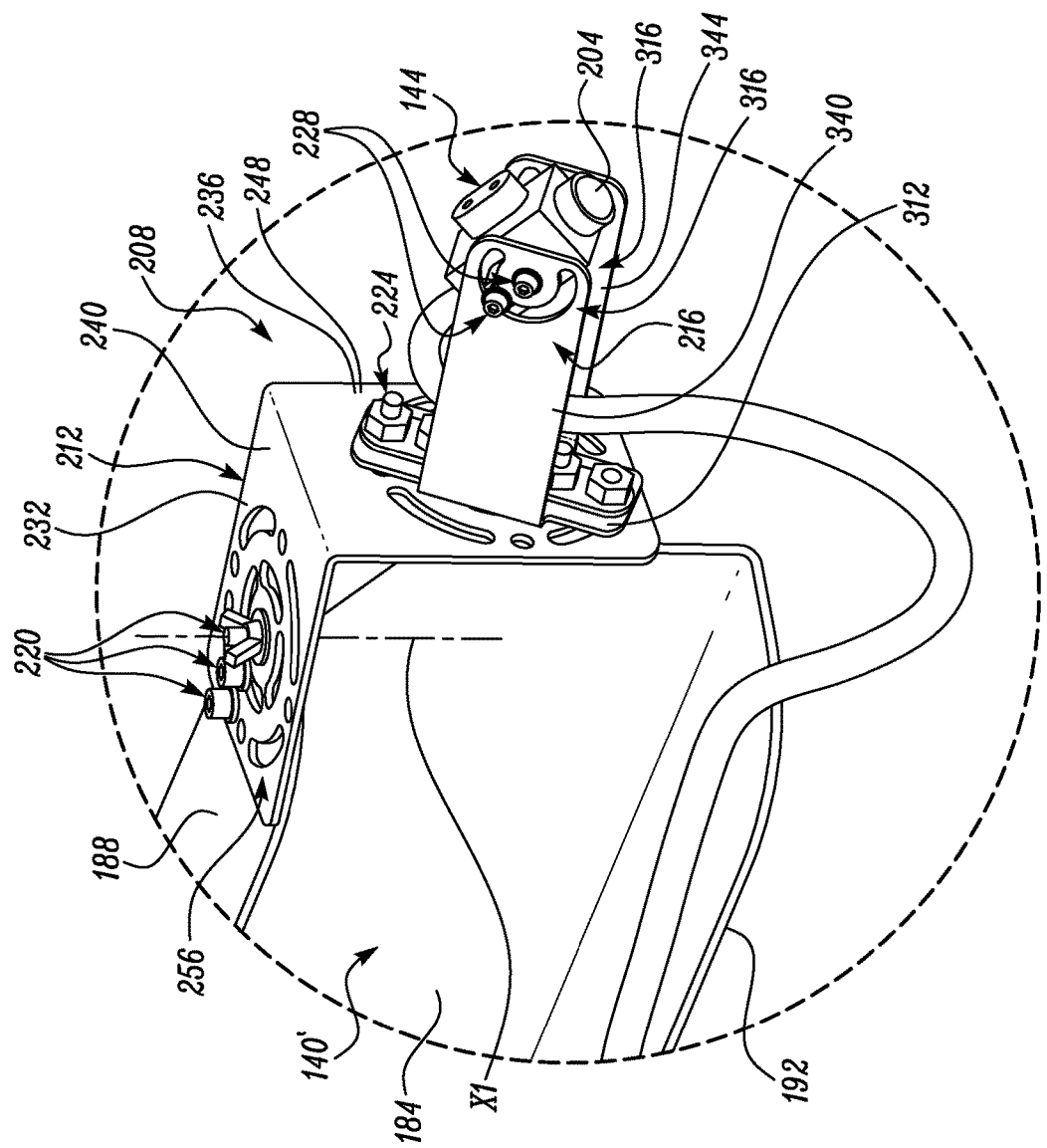
FIG. 2 illustrates a perspective view of a bracket assembly for mounting a visual perception device to a structure of the machine as viewed towards a lateral side of the mobile construction machine, in accordance with an embodiment of the present disclosure.

Further, the machine 100 includes a frame 120, one or more ground-engaging members 124, a propulsion system 128, an implement 132, an operator cabin 136, a structure 140, and a visual perception device 144 (shown in FIG. 2).

The frame 120 may accommodate and/or support the propulsion system 128, the implement 132, and the operator cabin 136, although other known components may be supported by the frame 120, as well. The ground-engaging members 124 may support and propel the frame 120 (or the machine 100) from one location to another during an operation. The ground-engaging members 124 may include a set of front wheels 148 and a set of rear wheels 152. In some embodiments, the ground-engaging members 124 may include crawler tracks (not shown) provided either alone or in combination with the wheels 148, 152.

The propulsion system 128 may include a power compartment 156 (or vent hood 156) and a power source (not shown), such as an internal combustion engine, provided within the power compartment 156. The power source may be configured to power operations of various systems on the machine 100, typically by combusting fuel. Optionally, the propulsion system 128 may also include an electrical power source, applicable either alone or in combination with the internal combustion engine. The implement 132 may be connected to the frame 120, via a linkage assembly 160. In the present embodiment, the implement 132 is embodied as a bucket 132' configured to perform one or more work operations, such as loading, stock piling, dumping, and the like.

The operator cabin 136 may acquire a position between the implement 132 and the power compartment 156. The operator cabin 136 may facilitate stationing of one or more operators therein, to monitor the operations of the machine 100. Also, the operator cabin 136 may house various components and controls of the machine 100, access to one or more of which may help the operators to control the machine's movement and/or operation. For example, the various components and controls of the machine 100 may include one or more steering wheels, touch screens, display devices, joysticks, switches etc., to facilitate an operator in operating the machine 100 and the implement 132.

The operator cabin 136 may include a front portion 164, a rear portion 168, a left-hand portion 172, a right-hand portion 176, and a roof portion 180. The rear portion 168 may be disposed opposite to the front portion 164. The front portion 164 and the rear portion 168 may be defined along the direction of travel 'A' of the machine 100. Also, the front portion 164 and the rear portion may be spaced apart from each other. The front portion 164 may be disposed proximally relative to the forward end 104 and distally relative to the rearward end 108 of the machine 100. The rear portion 168 may be disposed proximally relative to the rearward end 108 and distally relative to the forward end 104 of the machine 100.

The left-hand portion 172 and a right-hand portion 176 may be located transversely relative to the direction of travel 'A' of the machine 100. The left-hand portion 172 may be laterally opposite to the right-hand portion 176. The left-hand portion 172 may be disposed towards the first lateral side 112 of the machine 100 and the right-hand portion 176 may be disposed towards the second lateral side 116 of the machine 100, when viewed from the rearward end 108 towards the forward end 104 of the machine 100. The roof portion 180 may extend between the rear portion 168 and the front portion 164 of the operator cabin 136 along the direction of travel 'A' of the machine 100. Also, the roof portion 180 may extend between the left-hand portion 172 and the right-hand portion 176 transversely relative to the direction of travel 'A' of the machine 100.

Two structures 140—i.e., a structure 140' and a structure 140", are attached to the machine 100. The structure 140' will be discussed with reference to FIG. 2. The structure 140' may define a first section 184, a second section 188, and a third section 192. The first section 184 may be plate-shaped and may be generally elongated in profile. The first section 184 may extend between the second section 188 and the third section 192. In that manner, the second section 188 and the third section 192 may be disposed at either ends of the first section 184. The second section 188 and the third section 192 may be angularly disposed with respect to the first section 184. In the present embodiment, the second section 188 and the third section 192 are disposed at right angles with respect to the first section 184 to impart a C-shaped profile to the structure 140. Further, the structure 140 includes an aperture 196 and one or more through-holes 200 defined at the second section 188 (please see FIG. 4). In the present embodiment, two through-holes 200, i.e., a through-hole 200' and a through-hole 200" are defined at the second section 188 of the structure.

The structure 140' may be attached at any location to the machine 100. In the present embodiment, the structure 140' is attached to the left-hand portion 172 of the operator cabin 136. Accordingly, the structure 140' extends outwardly from the left-hand portion 172 towards the first lateral side 112 of the machine 100 (as shown in FIG. 1). In other embodiments, the structure 140' may be attached to the roof portion 180 of the operator cabin 136 or the vent hood 156.

The structure 140" may be attached to the right-hand portion 176 of the operator cabin 136. The structure 140" may extend outwardly from the right-hand portion 176 towards the second lateral side 116 of the machine 100. The structure 140" may be similar to the structure 140 in construction and configuration, and hence will not be discussed.

The visual perception device 144 may be configured to obtain visual feeds (or image data), for example, still images, video streams, time lapse sequences, etc., associated with one or more views of the machine 100 and its surroundings. In the present embodiment, the visual perception device 144 embodies a camera 204 configured to obtain visual feeds of the machine 100 and/or an external environment of the machine 100 from the first lateral side 112 of the machine 100.

The camera 204 may be a monochrome digital camera, a high-resolution digital camera, or any suitable digital camera. Further, the camera 204 may include a still camera, a camcorder, a video camera, a Closed-Circuit Television (CCTV) camera, and the like, without any limitations. The camera 204 may also include optical flow chips that facilitate acquisition of images. In some examples, the camera 204 may embody a Complimentary Metal-Oxide Semiconductor (CMOS) camera.

It is contemplated that the visual perception device 144 could alternatively embody another type of perception device such as, for example, LIDAR (light detection and ranging) devices, RADAR (radio detection and ranging) devices, SONAR (sound navigation and ranging) devices, thermal scanners, and/or other types of devices for obtaining visual associated with the one or more views of the machine 100 and its surroundings.

Figure 3:
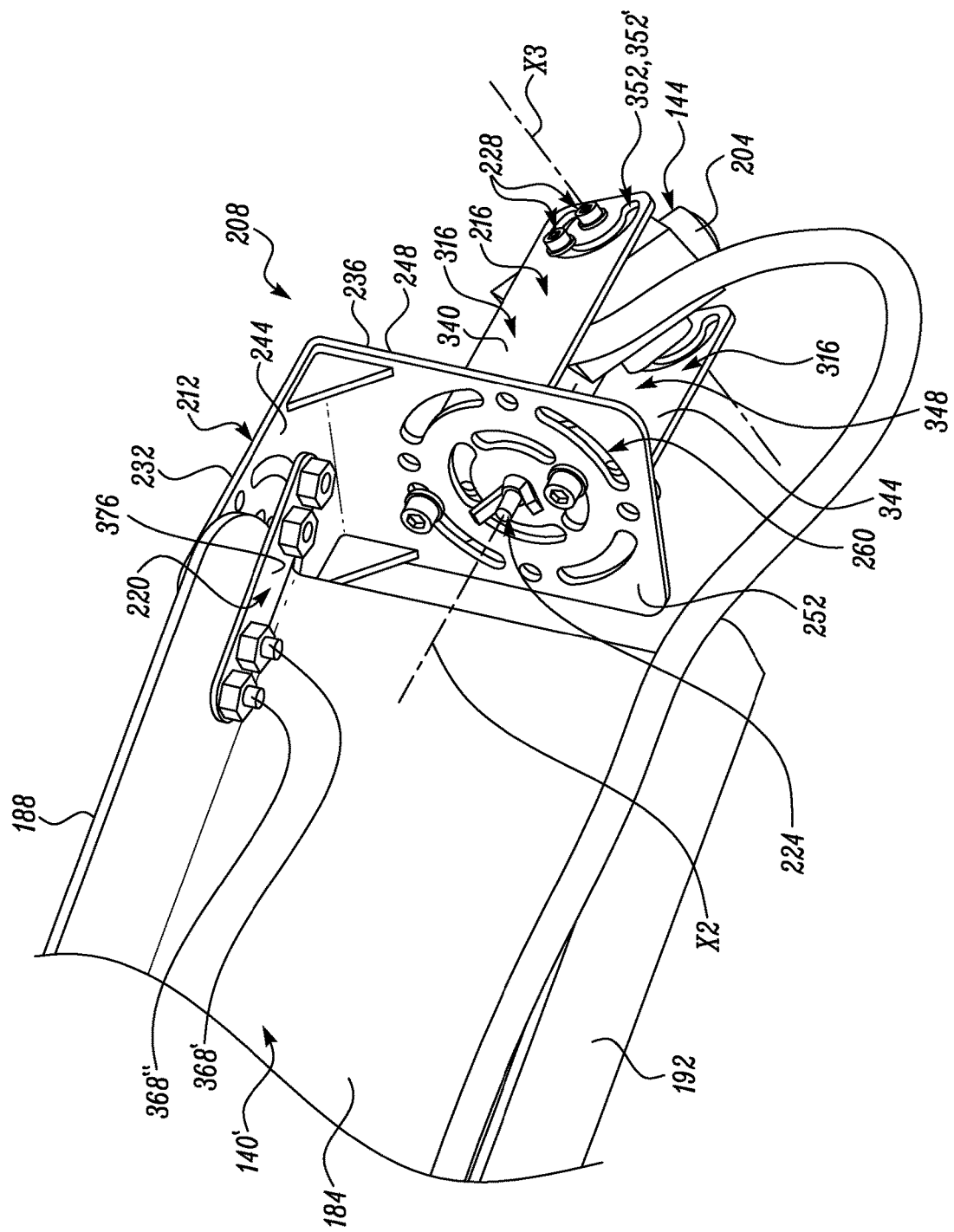
FIG. 3 illustrates a perspective view of the bracket assembly as viewed away from the lateral side of the mobile construction machine, in accordance with an embodiment of the present disclosure.
Figure 4:
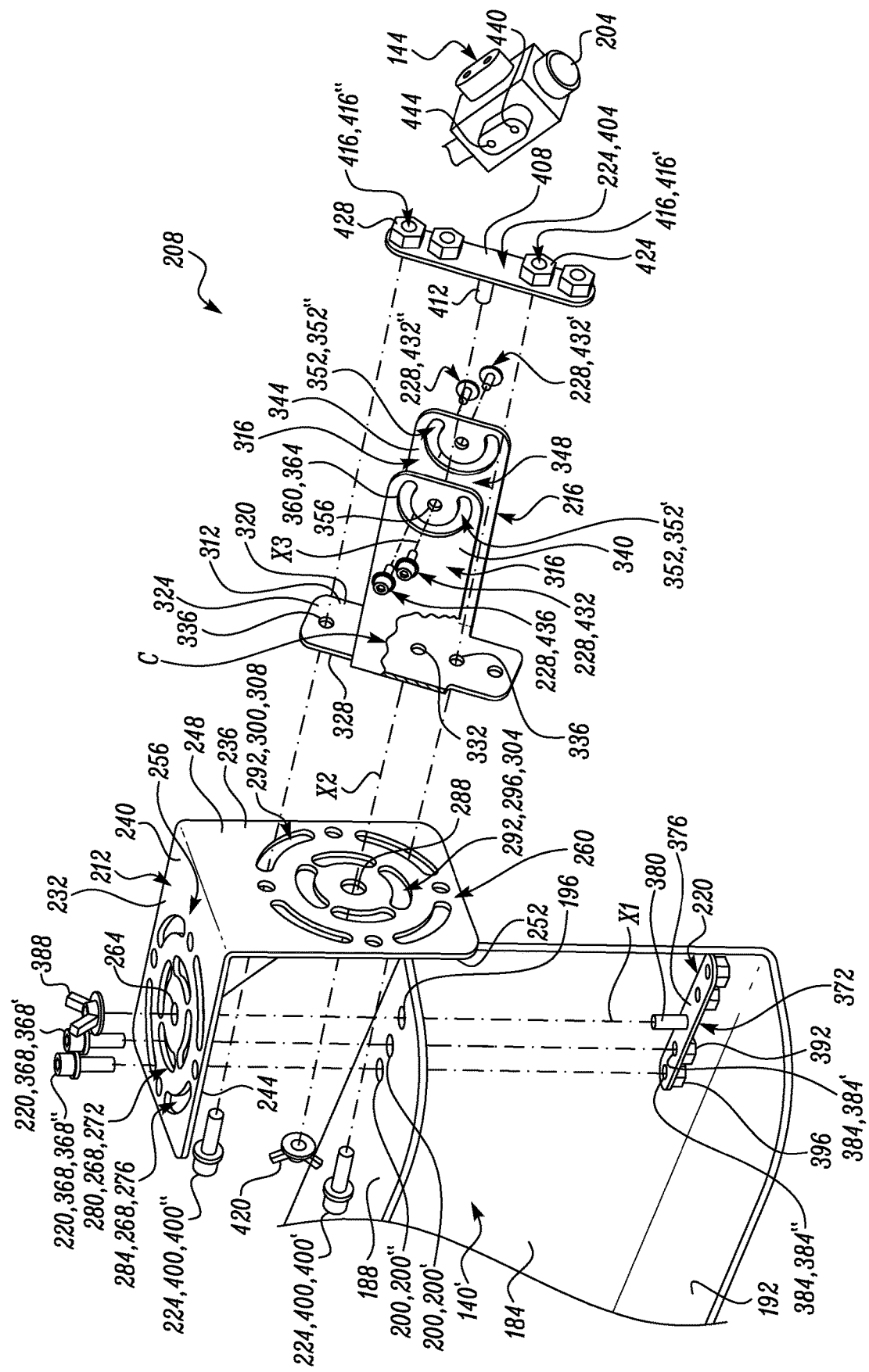
FIG. 4 illustrates an exploded view of the bracket assembly, in accordance with an embodiment of the present disclosure.

Referring to FIGS. 2, 3, and 4, the machine 100 includes a bracket assembly 208. The bracket assembly 208 facilitates mounting of the visual perception device 144 (or the camera 204) to the machine 100. For instance, the bracket assembly 208 is configured to mount the visual perception device 144 to the structure 140' of the machine 100. The bracket assembly 208 includes a first bracket 212, a second bracket 216, a first coupling mechanism 220, a second coupling mechanism 224, and a third coupling mechanism 228. Details related to each of the first bracket 212, the second bracket 216, the first coupling mechanism 220, the second coupling mechanism 224, and the third coupling mechanism 228 will now be discussed.

The first bracket 212 may define a first segment 232 and a second segment 236. The first segment 232 may define a first surface 240 and a second surface 244 opposite to the first surface 240. In the present embodiment, the first surface 240 faces outwardly away from the second section 188 of the structure 140', and the second surface 244 faces inwardly towards the second section 188 of the structure 140' when the first bracket 212 is coupled to the structure 140' (please see FIGS. 2 and 3).

The second segment 236 may be angled with respect to the first segment 232. In the present embodiment, the second segment 236 extends perpendicular to the first segment 232 to impart an L-shaped profile to the first bracket 212. The second segment 236 may define a third surface 248 and a fourth surface 252. In the present embodiment, the third surface 248 faces outwardly away from the left-hand portion 172 of the operator cabin 136, and the fourth surface 252 faces inwardly towards the left-hand portion 172 of the operator cabin 136 when the first bracket 212 is coupled to the structure 140' (please see FIGS. 2 and 3).

Further, the first bracket 212 defines a first slotted structure 256 and a second slotted structure 260. The first slotted structure 256 may be defined at the first segment 232 of the first bracket 212. The first slotted structure 256 includes a first aperture 264 and one or more first slots 268 (please see FIG. 4). The first aperture 264 defines a first axis 'X1'. The first aperture 264 extends between the first surface 240 and the second surface 244 of the first segment 232 along the first axis 'X1'.

The first slots 268 may be defined around the first aperture 264 about the first axis 'X1'. The one or more first slots 268 may include a first set of arcuate slots 272 and a second set of arcuate slots 276. In the present embodiment, the first set of arcuate slots 272 includes four arcuate slots 280 defined circumferentially around the first aperture 264, and the second set of arcuate slots 276 includes four arcuate slots 284 defined circumferentially around the first set of arcuate slots 272. The first set of arcuate slots 272 and the second set of arcuate slots 276 may be defined concentric with the first aperture 264 about the first axis 'X1' to facilitate selective positioning (e.g., by rotation) of the first bracket 212 in a plurality of first positions about the first axis 'X1' with respect to the structure 140 (and/or the machine 100). As used herein, the term "first position" may be defined as any 360-degree position or location about the first axis 'X1'.

The second slotted structure 260 may be defined at the second segment 236 of the first bracket 212. The second slotted structure 260 includes a second aperture 288 and one or more second slots 292 (please see FIG. 4). The second aperture 288 defines a second axis 'X2' disposed angularly with respect to the first axis 'X1'. In the present embodiment, the second axis 'X2' is substantially orthogonally disposed with respect to the first axis 'X1'. The term "substantially orthogonally" means that an angle between the first axis 'X1' and the second axis 'X2' is close to being a right angle, barring angular differences that may arise due to manufacturing tolerances in practical applications. The second aperture 288 extends between the third surface 248 and the fourth surface 252 of the second segment 236 along the second axis 'X2'.

The second slots 292 may be defined around the second aperture 288 about the second axis 'X2'. The second slots 292 may include a third set of arcuate slots 296 and a fourth set of arcuate slots 300. In the present embodiment, the third set of arcuate slots 296 includes four arcuate slots 304 defined circumferentially around the second aperture 288, and the fourth set of arcuate slots 300 includes four arcuate slots 308 defined circumferentially around the third set of arcuate slots 296. The third set of arcuate slots 296 and the fourth set of arcuate slots 300 may be defined concentric with the second aperture 288 about the second axis 'X2' to facilitate selective positioning (e.g., by rotation) of the second bracket 216 in a plurality of second positions about the second axis 'X2' with respect to the first bracket 212. As used herein, the term "second position" may be defined as any 360-degree position or location about the second axis 'X2'.

The second bracket 216 will now be discussed. The second bracket 216 includes a first portion 312 and a second portion 316. The first portion 312 may embody as a base plate 320 that defines a fifth surface 324 and a sixth surface 328 opposite to the fifth surface 324. In the present embodiment, the fifth surface 324 faces outwardly away from the third surface 248 of the first bracket 212, and the sixth surface 328 faces inwardly towards the third surface 248 of the first bracket 212 when the second bracket 216 is coupled to the first bracket 212 (please see FIG. 4). In other embodiments, the fifth surface 324 may face inwardly away from the fourth surface 252 of the first bracket 212, and the sixth surface 328 may face outwardly towards the fourth surface 252 of the first bracket 212 when the second bracket 216 is coupled to the first bracket 212.

Further, the first portion 312 may define an aperture 332 (shown through a cut-out section 'C' of the second portion, in FIG. 4) and one or more through-holes 336. Each of the aperture 332 and the through-holes 336 may extend between the fifth surface 324 and the sixth surface 328. The aperture 332 and the through-holes 336 may be spaced from each other. In the present embodiment, four through-holes 336, two on each side of the aperture 332, are defined on the first portion 312 of the second bracket 216.

The second portion 316 extends from the first portion 312. For instance, the second portion 316 may include two side plates—i.e., a first side plate 340 and a second side plate 344 extending from either ends of the base plate 320 (or the first portion 312). Although not limited, each of the first side plate 340 and the second side plate 344 may be substantially a planarly formed component. The first side plate 340 and the second side plate 344 may be parallel and spaced apart from each other. Both the first side plate 340 and the second side plate 344 may extend perpendicular to the base plate 320, and in so doing, an arrangement of the side plates 340, 344 and the base plate 320 may impart a U-shaped profile to the second bracket 216. Further, the base plate 320, the side plates 340, 344 may combinedly define an opening 348 configured to enclose at least a portion of the visual perception device 144 connected to the second bracket 216.

The second portion 316 defines a third slotted structure 352. In the present embodiment, the first side plate 340 defines a third slotted structure 352' and the second side plate 344 defines a third slotted structure 352". The third slotted structure 352' defined at the first side plate 340 will now be discussed. The third slotted structure 352' includes a third aperture 356 and one or more third slots 360 (please see FIG. 4).

The third aperture 356 defines a third axis 'X3' disposed angularly with respect to the first axis 'X1' and the second axis 'X2'. In the present embodiment, the third axis 'X3' is substantially orthogonally disposed with respect to the first axis 'X1' and the second axis 'X2', respectively. The term "substantially orthogonally" means that an angle between the third axis 'X3' and the first axis 'X1', and an angle between the third axis 'X3' and the second axis 'X2', are close to being right angles, barring angular differences that may arise due to manufacturing tolerances in practical applications. Further, the third aperture 356 extends through the first side plate 340 along the third axis 'X3'.

The third slots 360 may include a fifth arcuate slot 364 defined concentric with the third aperture 356 about the third axis 'X3' to facilitate selective positioning (e.g., by rotation) of the visual perception device 144 in a plurality of third positions about the third axis 'X3' with respect to the second bracket 216. As used herein, the term "third position" may be defined as any 360-degree position or location about the third axis 'X3'.

In other embodiments, multiple fifth arcuate slots, similar to the fifth arcuate slot 364 in construction and configuration, may be defined at the first side plate 340. The third slotted structure 352" defined at the second side plate 344 is similar to the third slotted structure 352' in construction and configuration, and hence will not be discussed. In other embodiments, the third slotted structure 352 may be defined at any one of the first side plate 340 and the second side plate 344.

The first coupling mechanism 220 will now be discussed. The first coupling mechanism 220 may include one or more first fasteners 368 and a first coupler 372. In the present embodiment, the first coupling mechanism 220 includes two first fasteners 368—i.e., a first fastener 368' and a first fastener 368". In other embodiments, the first coupling mechanism 220 may include higher or lesser number of the first fasteners 368. The first coupler 372 may define a head plate 376 and a threaded shank portion 380. The head plate 376 may have a flat shape. The head plate 376 may define one or more first through-holes 384. In the present embodiment, the head plate 376 includes two first through holes—i.e., a first through-hole 384' and a first through-hole 384". The threaded shank portion 380 may extend upright and away from the head plate 376.

The first coupling mechanism 220 is configured to engage the first slotted structure 256 of the first bracket 212 with the structure 140' to couple the first bracket 212 to the structure 140' at a first position of the plurality of first positions about the first axis 'X1'. For that, the threaded shank portion 380 (of the first coupler 372) may be passed through the corresponding aperture 196 of the structure 140' and may be received and axially secured (via a nut 388) with the first aperture 264 of the first bracket 212. Subsequently, the first fastener 368' may be passed through the corresponding arcuate slot 280 (of the first set of arcuate slots 272) and the through-hole 200' in the structure 140' and may be correspondingly received and secured (via a nut 392) within the first through-hole 384' of the first coupler 372. Similarly, the first fastener 368" may be passed through the corresponding arcuate slot 284 (of the second set of arcuate slots 276) and the through-hole 200" in the structure 140' and may be correspondingly received and secured (via a nut 396) within the first through-hole 384" of the first coupler 372.

The second coupling mechanism 224 will now be discussed. The second coupling mechanism 224 may include one or more second fasteners 400 and a second coupler 404. In the present embodiment, the second coupling mechanism 224 includes two second fasteners 400—i.e., a second fastener 400' and a second fastener 400". In other embodiments, the second coupling mechanism 224 may include higher or lesser number of the second fasteners 400. The second coupler 404 may define a head plate 408 and a threaded shank portion 412. The head plate 408 may have a flat shape. The head plate 408 may define one or more second through-holes 416. In the present embodiment, the head plate 408 includes two second through holes—i.e., a second through-hole 416' and a second through-hole 416". The threaded shank portion 412 may extend upright and away from the head plate 408.

The second coupling mechanism 224 is configured to engage the first portion 312 of the second bracket 216 with the second slotted structure 260 (of the first bracket 212) to couple the first portion 312 of the second bracket 216 to the first bracket 212 at a second position of the plurality of second positions about the second axis 'X2'. For that, the threaded shank portion 412 (of the second coupler 404) may be passed through the corresponding aperture 332 of the first portion 312 and may be received and axially secured (via a nut 420) with the second aperture 288 of the first bracket 212. Subsequently, the second fastener 400' may be passed through the corresponding arcuate slot 304 (of the third set of arcuate slots 296) and the through-hole 336 in the first portion 312 of the second bracket 216 and may be correspondingly received and secured (via a nut 424) with the second through-hole 416' of the second coupler 404. Similarly, the second fastener 400" may be passed through the corresponding arcuate slot 308 (of the fourth set of arcuate slots 300) and the through-hole 336 in the first portion 312 of the second bracket 216 and may be correspondingly received and secured (via a nut 428) with the second through-hole 416" of the second coupler 404.

The third coupling mechanism 228 will now be discussed. The third coupling mechanism 228 may include one or more third fasteners 432 and one or more fourth fasteners 436. In the present embodiment, the third coupling mechanism 228 includes a third fastener 432 and a fourth fastener 436 configured to engage the visual perception device 144 with the third slotted structure 352' defined in the first side plate 340 of the second portion 316. Similarly, the third coupling mechanism 228 may include a third fastener 432' and a fourth fastener 436' configured to engage the visual perception device 144 with the third slotted structure 352" defined in the second side plate 344 of the second portion 316.

Further, the third coupling mechanism 228 is configured to couple the visual perception device 144 to the second portion 316 of the second bracket 216 at a third position of the plurality of third positions about the third axis 'X3'. For that, the third fastener 432 may be passed through the third aperture 356 (defined in the first side plate 340) and may be received and secured with a first threaded hole 440 defined at the visual perception device 144, and the fourth fastener 436 may be passed through the fifth arcuate slot 364 (defined in the first side plate 340) and may be received and secured with a second threaded hole 444 defined at the visual perception device 144. Similarly, the third fastener 432' and the fourth fastener 436' may be secured to their corresponding threaded holes formed on the visual perception device 144.

It may be contemplated that the machine 100 may include multiple bracket assemblies, similar to the bracket assembly 208 in construction and configuration, each configured to mount the corresponding visual perception devices 144 at different locations (or portions) of the machine 100. For example, as shown in FIG. 1, another bracket assembly 208' (similar to the bracket assembly 208) may facilitate mounting of another visual perception device 144' (similar to the visual perception device 144) to the roof portion 180 towards the front portion 164 of the operator cabin 136, and at a desired angular orientation to obtain a desired visual feed of an external environment of the machine 100 from the front portion 164 of the operator cabin 136. In another example, yet another bracket assembly 208" (similar to the bracket assembly 208) may facilitate mounting of yet another visual perception device 144" (similar to the visual perception device 144) to the roof portion 180 towards the rear portion 168 of the operator cabin 136, and at another desired angular orientation to obtain another desired visual feed of an external environment of the machine 100 from the rear portion 168 of the operator cabin 136. In yet another example, another bracket assembly 208''' (similar to the bracket assembly 208) may facilitate mounting of yet another visual perception device 144''' (similar to the visual perception device 144) to the vent hood 156, and at desired angular orientation to obtain another desired visual feed of an external environment of the machine 100 from the vent hood 156 of the machine 100.

INDUSTRIAL APPLICABILITY

An exemplary method of mounting the visual perception device 144 to the structure 140' of the machine 100, by utilizing the bracket assembly 208, will be discussed. Initially, the visual perception device 144 is mounted to the second portion 316 (i.e., to the first side plate 340 and the second side plate 344) of the second bracket 216 at the third position of the plurality of third positions about the third axis 'X3'. For that, the visual perception device 144 is disposed within the opening 348 (defined between the first side plate 340 and the second side plate 344) such that the first threaded hole 440 and the second threaded hole 444 of the visual perception device 144 is aligned with their corresponding third aperture 356 and the fifth arcuate slot 364 defined at the first side plate 340. Subsequently, the third fastener 432 is passed through the third aperture 356 and is received and secured (loosely) with the first threaded hole 440 of the visual perception device 144. In addition, the fourth fastener 436 is passed through the fifth arcuate slot 364 and is received and secured (loosely) within the second threaded hole 444 of the visual perception device 144.

Once the visual perception device 144 is loosely mounted to the second portion 316 of the second bracket 216, the visual perception device 144 may be rotated about the third axis 'X3' to attain the third position. Next, the third fastener 432 and the fourth fastener 436 are tightly secured to the corresponding first threaded hole 440 and the second threaded hole 444 of the visual perception device 144. In a similar manner, the visual perception device 144 may be secured to the second side plate 344 of the second bracket 216, via the third fastener 432' and the fourth fastener 436'.

Further, the second bracket 216 along with the visual perception device 144 is mounted to the first bracket 212 at the second position of the plurality of second positions about the second axis 'X2'. For that, the first portion 312 of the second bracket 216 is engaged with the second slotted structure 260 (defined at the second segment 236 of the first bracket 212) in a manner such that the sixth surface 328 (of the first portion 312) is abutted against the third surface 248 of the second segment 236, and that the aperture 332 (of the first portion 312) is aligned with the corresponding second aperture 288 (of the second slotted structure 260). Subsequently, the threaded shank portion 412 (of the second coupler 404) is passed through the corresponding aperture 332 of the first portion 312 and is received and axially secured (loosely, via the nut 420) with the second aperture 288 of the first bracket 212. Next, the first portion 312 may be rotated about the second axis 'X2' to attain the second position. At the second position, the through-holes 336 (in the first portion 312) may be aligned with their corresponding arcuate slots 304 (of the third set of arcuate slots 296) and the arcuate slots 308 (of the fourth set of arcuate slots 300).

Once the first portion 312 (of the second bracket 216) along with the visual perception device 144 is at the second position about the second axis 'X2', the threaded shank portion 412 is tightly secured to the second aperture 288 of the first bracket 212. Subsequently, the second fastener 400' is passed through the corresponding arcuate slot 304 and through-hole 336 and is correspondingly received and secured (via the nut 424) within the second through-hole 416' of the second coupler 404. In addition, the second fastener 400" is passed through the corresponding arcuate slot 308 (of the fourth set of arcuate slots 300) and through-hole 336 and is correspondingly received and secured (via the nut 428) within the second through-hole 416" of the second coupler 404.

Further, the first bracket 212 (coupled to the second bracket 216 with the visual perception device 144 mounted thereon) is mounted to the second section 188 of the structure 140' at the first position of the plurality of first positions about the first axis 'X1'. For that, the first segment 232 of the first bracket 212 is engaged with the second section 188 of the structure 140' in a manner such that the second surface 244 (of the first segment 232) is abutted against the second section 188, and that the first aperture 264 (of the first bracket 212) is aligned with the corresponding aperture 196 of the structure 140'. Subsequently, the threaded shank portion 380 (of the first coupler 372) is passed through the corresponding aperture 196 of the structure 140' and is received and axially secured (loosely, via the nut 388) with the first aperture 264 of the first bracket 212. Next, the first bracket 212 may be rotated about the first axis 'X1' to attain the first position. At the first position, the first through-hole 384' and the first through-hole 384" (in the structure 140) may be aligned with their corresponding arcuate slot 280 (of the first set of arcuate slots 272) and the arcuate slots 284 (of the second set of arcuate slots 276).

Once the first bracket 212 is at the first position about the first axis 'X1', the threaded shank portion 380 is tightly secured to the first aperture 264 of the first bracket 212. Subsequently, the first fastener 368' is correspondingly passed through the arcuate slot 280 and the through-hole 200' in the structure 140 and is correspondingly received and secured (via the nut 392) within the first through-hole 384' of the first coupler 372. In addition, the first fastener 368" is correspondingly passed through the arcuate slot 284 and the through-hole 200" in the structure 140 and is correspondingly received and secured (via the nut 396) within the first through-hole 384" of the first coupler 372.

The order in which the above-mentioned steps of mounting the visual perception device 144 to the structure 140' of the machine 100 is not intended to be construed as a limitation, and any number of the above-mentioned steps may be combined in any order and/or in parallel, as and when desired during operations of the machine 100.

As discussed above, the bracket assembly 208 facilitates mounting of the visual perception device 144 at any desired position (e.g., the first position, the second position, and the third position) with respect to the three axes—i.e., the first axis 'X1', the second axis 'X2', and the third axis 'X3'. Accordingly, the bracket assembly 208 offers flexibility to easily mount (or adjust) the visual perception device 144 at any desired angle with respect to at least one of: a pitch axis, a yaw axis, and a roll axis associated with the machine 100, as and when needed.

In an exemplary scenario, the operator may adjust the first bracket 212 and the second bracket 216 (of at least one of the bracket assemblies 208, 208', 208", 208''') with respect to at least one of the pitch axis, the yaw axis, and the roll axis to properly align the horizon (or the implement 132) displayed across the video feeds provided by the visual perception devices 144, 144', 144", 144'''. This alignment of the video feeds may reduce the likelihood of operator fatigue, which usually occurs by viewing the inappropriately aligned video feeds during or after a period of operation. In addition, implementation of the bracket assemblies 208, 208', 208", 208''' for mounting the visual perception devices 144, 144', 144", 144''' may eliminate the possibility of any loss or alteration of the visual data (associated with the machine's surroundings) that may occur if the video streams (or images) provided by the visual perception devices 144, 144', 144", 144''' were digitally modified.

Further, the bracket assembly 208 mitigates (or eliminates) the requirement of installing different mounting hardware (e.g., brackets of different shapes and configurations), for mounting the visual perception devices at different locations on the machine 100. For instance, the bracket assembly 208 that is used to mount the visual perception device 144 to the structure 140 attached to the left-hand portion 172 of the operator cabin 136, may be used to mount a visual perception device (similar to the visual perception device 144) to the roof portion 180 of the operator cabin 136 as well. This may contribute to overall cost reduction. Further, the bracket assembly 208 has applicability for use in mounting visual perception devices (similar to the visual perception device 144) to different types of machines (i.e., machines having different shapes, sizes, and configurations).

It will be apparent to those skilled in the art that various modifications and variations can be made to the bracket assembly of the present disclosure without departing from the scope of the disclosure. Other embodiments will be apparent to those skilled in the art from consideration of the specification and practice of the bracket assembly disclosed herein. It is intended that the specification and examples be considered as exemplary only, with a true scope of the disclosure being indicated by the following claims and their equivalent.

What is claimed is:

1. A bracket assembly for mounting a visual perception device to a mobile construction machine, the bracket assembly comprising:
a first bracket selectively positionable in a plurality of first positions with respect to a structure configured to attach to the mobile construction machine, the structure having a first section, a second section and a third section, the second section and the third section are angularly disposed with respect to the first section imparting a C-shaped profile to the structure, the plurality of first positions being defined around a first axis, the first bracket having a first segment configured to attach the first bracket to the structure and a second segment, the second segment extends perpendicularly from the first segment imparting a L-shaped profile to the first bracket; and
a second bracket defining:
a first portion selectively positionable in a plurality of second positions with respect to the first bracket, the plurality of second positions being defined around a second axis, the first portion extends perpendicularly to the second segment, and
a second portion including a first side plate and a second side plate each extending from a center of a first elongated side and a second elongated side, respectively of the first portion in a parallel direction to the first segment, the second portion facilitating a selective positioning of the visual perception device in a plurality of third positions with respect to the second portion, the plurality of third positions being defined around a third axis, in which the first side plate, the second side plate, and the first portion impart a U-shaped profile to the second bracket, and the visual perception device is attached between the first plate and the second plate.

2. The bracket assembly of claim 1, wherein the first axis, the second axis and the third axis are substantially orthogonally disposed with respect to each other.

3. The bracket assembly of claim 1, wherein the first bracket defines a first slotted structure including a first aperture defining the first axis and one or more first slots defined around the first aperture about the first axis, the bracket assembly further including a first coupling mechanism to engage the structure with the first slotted structure to couple the first bracket at a first position of the plurality of first positions.

4. The bracket assembly of claim 3, wherein the one or more first slots include a first set of arcuate slots and a second set of arcuate slots, and wherein the first set of arcuate slots and the second set of arcuate slots being defined concentric with the first aperture about the first axis to selectively position the first bracket in the plurality of first positions about the first axis.

5. The bracket assembly of claim 3, wherein the first coupling mechanism includes one or more first fasteners and a first coupler defining a head plate with one or more first through-holes and a threaded shank portion extending from the head plate, wherein, to couple the first bracket to the structure at the first position:
the threaded shank portion is passed through a corresponding aperture of the structure and is received and axially secured with the first aperture, and
the one or more first fasteners are correspondingly passed through the one or more first slots and one or more through-holes in the structure and are correspondingly received and secured within the one or more first through-holes of the first coupler.

6. The bracket assembly of claim 1, wherein the first bracket defines a second slotted structure including a second aperture defining the second axis and one or more second slots defined around the second aperture about the second axis, the bracket assembly further including a second coupling mechanism to engage the first portion of the second bracket with the second slotted structure to couple the first portion of the second bracket to the first bracket at a second position of the plurality of second positions.

7. The bracket assembly of claim 6, wherein the one or more second slots include a third set of arcuate slots and a fourth set of arcuate slots, and wherein the third set of arcuate slots and the fourth set of arcuate slots being defined concentric with the second aperture about the second axis to selectively position the first portion of the second bracket in the plurality of second positions about the second axis.

8. The bracket assembly of claim 6, wherein the second coupling mechanism includes one or more second fasteners and a second coupler defining a head plate with one or more second through-holes and a threaded shank portion extending from the head plate, wherein, to couple the first portion of the second bracket to the first bracket at the second position:

the threaded shank portion is passed through a corresponding aperture of the first portion of the second bracket and is received and axially secured with the second aperture, and the one or more second fasteners are correspondingly passed through the one or more second slots and one or more through-holes in the first portion of the second bracket and are correspondingly received and secured within the one or more second through-holes of the second coupler.

9. The bracket assembly of claim 1, wherein the second portion of the second bracket defines a third slotted structure including a third aperture defining the third axis and one or more third slots defined around the third aperture about the third axis, the one or more third slots include a fifth arcuate slot defined concentric with the third aperture about the third axis to selectively position the visual perception device in the plurality of third positions about the third axis, the bracket assembly further including a third coupling mechanism to engage the visual perception device with the third slotted structure to couple the visual perception device to the second portion of the second bracket at a third position of the plurality of third positions.

10. The bracket assembly of claim 9, wherein the third coupling mechanism includes one or more third fasteners and one or more fourth fasteners, wherein, to couple the visual perception device to the second portion of the second bracket at the third position:

the one or more third fasteners are passed through the third aperture and are received and secured within one or more first threaded holes defined at the visual perception device, and the one or more fourth fasteners are correspondingly passed through the one or more third slots and are received and secured within one or more second threaded holes defined at the visual perception device.

11. A mobile construction machine, comprising:

a structure extending outwardly towards a lateral side of the mobile construction machine, the structure having a first section, a second section and a third section, the second section and the third section are angularly disposed with respect to the first section imparting a C-shaped profile to the structure;

a visual perception device configured to obtain a visual feed of an external environment of the mobile construction machine from the lateral side of the mobile construction machine; and a bracket assembly for mounting the visual perception device to the structure, the bracket assembly comprising:

a first bracket selectively positionable in a plurality of first positions with respect to the structure, the plurality of first positions being defined around a first axis, the first bracket having a first segment configured to attach the first bracket to the structure and a second segment, the second segment extends perpendicularly from the first segment imparting a L-shaped profile to the first bracket; and a second bracket defining:

a first portion selectively positionable in a plurality of second positions with respect to the first bracket, the plurality of second positions being defined around a second axis, the first portion extends perpendicularly to the second segment, and a second portion including a first side plate and a second side plate each extending from a center of a first elongated side and a second elongated side, respectively, of the first portion in a parallel direction to the first segment, the second portion facilitating a selective positioning of the visual perception device in a plurality of third positions with respect to the second portion, the plurality of third positions being defined around a third axis, in which the first side plate, the second side plate, and the first portion impart a U-shaped profile to the second bracket, and the visual perception device is attached between the first plate and the second plate.

12. The mobile construction machine of claim 11, wherein the first axis, the second axis and the third axis are substantially orthogonally disposed with respect to each other.

13. The mobile construction machine of claim 11, wherein the first bracket defines a first slotted structure including a first aperture defining the first axis and one or more first slots defined around the first aperture about the first axis, the bracket assembly further including a first coupling mechanism to engage the structure with the first slotted structure to couple the first bracket at a first position of the plurality of first positions.

14. The mobile construction machine of claim 13, wherein the one or more first slots include a first set of arcuate slots and a second set of arcuate slots, and wherein the first set of arcuate slots and the second set of arcuate slots being defined concentric with the first aperture about the first axis to selectively position the first bracket in the plurality of first positions about the first axis.

15. The mobile construction machine of claim 13, wherein the first coupling mechanism includes one or more first fasteners and a first coupler defining a head plate with one or more first through-holes and a threaded shank portion extending from the head plate, wherein, to couple the first bracket to the structure at the first position:

the threaded shank portion is passed through a corresponding aperture of the structure and is received and axially secured with the first aperture, and the one or more first fasteners are correspondingly passed through the one or more first slots and one or more through-holes in the structure and are correspondingly received and secured within the one or more first through-holes of the first coupler.

16. The mobile construction machine of claim 11, wherein the first bracket defines a second slotted structure including a second aperture defining the second axis and one or more second slots defined around the second aperture about the second axis, the bracket assembly further including a second coupling mechanism to engage the first portion of the second bracket with the second slotted structure to couple the first portion of the second bracket to the first bracket at a second position of the plurality of second positions.

17. The mobile construction machine of claim 16, wherein the one or more second slots include a third set of arcuate slots and a fourth set of arcuate slots, and wherein the third set of arcuate slots and the fourth set of arcuate slots being defined concentric with the second aperture about the second axis to selectively position the first portion of the second bracket in the plurality of second positions about the second axis.

18. The mobile construction machine of claim 16, wherein the second coupling mechanism includes one or more second fasteners and a second coupler defining a head plate with one or more second through-holes and a threaded shank portion extending from the head plate, wherein, to couple the first portion of the second bracket to the first bracket at the second position:

the threaded shank portion is passed through a corresponding aperture of the first portion of the second bracket and is received and axially secured with the second aperture, and the one or more second fasteners are correspondingly passed through the one or more second slots and one or more through-holes in the first portion of the second bracket and are correspondingly received and secured within the one or more second through-holes of the second coupler.

19. The mobile construction machine of claim 11, wherein the second portion of the second bracket defines a third slotted structure including a third aperture defining the third axis and one or more third slots defined around the third aperture about the third axis, the one or more third slots include a fifth arcuate slot defined concentric with the third aperture about the third axis to selectively position the visual perception device in the plurality of third positions about the third axis, the bracket assembly further including a third coupling mechanism to engage the visual perception device with the third slotted structure to couple the visual perception device to the second portion of the second bracket at a third position of the plurality of third positions.

20. The mobile construction machine of claim 19, wherein the third coupling mechanism includes one or more third fasteners and one or more fourth fasteners, wherein, to couple the visual perception device to the second portion of the second bracket at the third position:

the one or more third fasteners are passed through the third aperture and are received and secured within one or more first threaded holes defined at the visual perception device, and the one or more fourth fasteners are correspondingly passed through the one or more third slots and are received and secured within one or more second threaded holes defined at the visual perception device.

\* \* \* \* \*